United States Patent
McClure

(10) Patent No.: US 10,795,713 B2
(45) Date of Patent: Oct. 6, 2020

(54) LIVE MIGRATION OF A VIRTUALIZED COMPUTE ACCELERATOR WORKLOAD

(71) Applicant: VMware, Inc., Palo Alto, CA (US)

(72) Inventor: Matthew D. McClure, Alameda, CA (US)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 15/990,540

(22) Filed: May 25, 2018

(65) Prior Publication Data

US 2019/0361724 A1 Nov. 28, 2019

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 10,162,665 | B1 * | 12/2018 | Eidelman | G06F 9/45558 |
| 10,169,065 | B1 | 1/2019 | Nye | |
| 2014/0189332 | A1 | 7/2014 | Ben-Kiki et al. | |
| 2015/0309940 | A1 * | 10/2015 | Kumar | G06F 12/1009 |
| | | | | 345/506 |
| 2016/0321113 | A1 * | 11/2016 | Pinto | G06F 9/45533 |
| 2018/0089794 | A1 * | 3/2018 | Gopalakrishnan | G06F 21/62 |
| 2018/0114013 | A1 * | 4/2018 | Sood | G06F 9/45558 |
| 2019/0018800 | A1 * | 1/2019 | Jayasena | G06F 9/4856 |
| 2019/0065281 | A1 | 2/2019 | Bernat et al. | |
| 2019/0220323 | A1 * | 7/2019 | Belmar | G06F 9/4843 |

OTHER PUBLICATIONS

Torbjörn Sörman, "Comparison of Technologies for General-Purpose Computing on Graphics Processing Units", https://liu.divaportal.org/smash/get/diva2:909410/FULLTEXT01.pdf.
Ren Wu, "GPU-Accelerated Large Scale Analytics" http://www.hpl.hp.com/techreports/2009/HPL-2009-38.pdf.
Alex Krizhevsky, Ilya Sutskever, and Geoffrey E. Hinton, "ImageNet Classification with Deep Convolutional Neural Networks", http://www.nvidia.com/content/tesla/pdf/machine-learning/imagenetclassification-with-deep-convolutional-nn.pdf.
Jianbin Fang, Ana Lucia Varbanescu and Henk Sips, "A Comprehensive Performance Comparison of CUDA and OpenCL", https://pdfs.semanticscholar.org/d4e5/8e7c95d66f810252af630e74adbdbaf38da7.pdf.

(Continued)

*Primary Examiner* — Tammy E Lee
(74) *Attorney, Agent, or Firm* — Patterson + Sheridan LLP

(57) ABSTRACT

The disclosure provides an approach for modifying a kernel by adding conditional halting points. The disclosure also provides an approach for modifying a kernel by implementing a virtual shared memory between an application running on a CPU and a workload running on a compute accelerator. The disclosure provides an approach for setting up the kernel and its working set on a compute accelerator, executing the workload, suspending the workload, and then resuming the workload at a later time, optionally on a different host computer.

20 Claims, 8 Drawing Sheets

(56) References Cited

OTHER PUBLICATIONS

James Alan Farrell, "Compiler Basics", http://www.cs.man.ac.uk/~pjj/farrell/comp3.html, Aug. 1995.
Khronos OpenCL Working Group, "The OpenCL Environment Specification, Version: 2.1,", https://www.khronos.org/registry/OpenCL/specs/opencl-2.1-environment.pdf.
Intel Corporation, "OpenCL 2.0 Shared Virtual Memory Overview", https://software.intel.com/sites/default/files/managed/86/1f/SVMOverview.pdf.
Andrea Arcangeli, "Integrating KVM with the Linux Memory Management", https://www.linuxkvm.org/images/3/33/KvmForum2008%24kdf2008_15.pdf.
MSDN, "Fence-Based Resource Management", https://msdn.microsoft.com/enus/library/windows/desktop/dn899125(v=vs.85).aspx.

\* cited by examiner

LIVE MIGRATION OF A VIRTUALIZED COMPUTE ACCELERATOR WORKLOAD

CROSS-REFERENCE TO RELATED APPLICATION(S)

This application is related to U.S. patent application Ser. No. 15/990,537, entitled "Live Migration of a Virtualized Compute Accelerator Workload," filed May 25, 2018.

BACKGROUND

A compute accelerator (CA) is a specialized type of processor that performs certain mathematical calculations much faster than a conventional central processing unit (CPU). For example, a graphics processing unit (GPU) is a CA specially designed to rapidly manipulate and alter memory for the creation of images intended for output to a display device. Today, GPUs have been adopted as CAs for many fields of high performance computing outside of graphics processing, such as big data, artificial intelligence, neural networks, and cryptography. Other examples of CAs include specialized silicon, digital signal processors (DSPs), and field-programmable gate array (FPGAs).

CAs typically function in groups or farms in which many CAs work together to execute a kernel so as to perform a CA workload for that kernel. As used herein, a "kernel" is unrelated to the kernel of an operating system. In the context of CAs, a "kernel" or "compute kernel" is a small piece of code with one or more loops, and the loop(s) is executed many times by a CA or group of CAs to perform a CA workload. For example, to perform the CA workload of a transpose operation on a matrix, each column in the original matrix is turned into a row in the solution matrix. Turning each column of a matrix into a row is a simple but repetitive task. A very large matrix may be divided among several CAs, with each CA transposing a portion of the matrix.

As used herein, a "compute accelerator workload" is the set of operations that needs to be performed by one or more CAs in order to finish a distinct job on a working set. For example, to perform the CA workload of a "matrix transpose," the CA(s) needs to turn all columns of a matrix into rows. As used herein, a "working set" of a CA workload is the data on which the kernel works while performing the operations of a CA workload. For example, the original matrix is the working set for a "matrix transpose" CA workload.

Depending on the size of a working set or on the workload to be performed on that working set, the CA workload may take a significant amount of time. Some CA workloads may take hours, days, or weeks to finish. Due to the nature of how CAs operate, it is typically impossible to pause a CA workload and resume it again later from the same point of execution. If a compute CA is interrupted, it must be started again from the beginning.

This is disadvantageous for several reasons. CAs may be shared between applications or tenants. If one application uses the CAs for a prolonged period of time, other tenants or applications may not be able to perform any CA workloads during that time. Another reason is that during execution of a CA workload, it may be desirable to migrate the workload from one host computer to another host computer. For example, CAs may reside on different sets of hardware (e.g., different host computers) and the CAs of one or more host computers may be used to execute a CA workload. The migration might be desirable for load balancing reasons, such as to evenly utilize hosts available in a cluster of hosts. The migration might also be desirable for fault tolerance. For example, if certain hardware malfunctions during execution of a CA workload, it might be desirable to pause the workload, move it to another set of hardware (another host computer), and resume the workload where it left off.

SUMMARY

The present disclosure provides a method of implementing shared virtual memory between an application and one or more compute accelerators, the method comprising launching the application on a central processing unit (CPU) of a host computer, the application including a compute kernel, creating a custom translation lookaside buffer (TLB), and executing, on the one or more compute accelerators, the compute kernel, wherein the compute kernel accesses the custom TLB during the execution of the compute kernel. The TLB is created by obtaining a reference that points to a data item within a portion of memory of the host computer, the portion of memory containing a working set, translating the reference from a virtual address space of the application to a virtual address space of the one or more compute accelerators, and adding a mapping, to the custom TLB, of (a) a virtual address of the data item within the virtual address space of the application to (b) a virtual address of the data item within the virtual address space of the one or more compute accelerators.

Further embodiments include a non-transitory computer-readable storage medium storing instructions that, when executed by a computing system, cause the computing device to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for augmenting a kernel with conditional halting points at which a kernel workload may be suspended. The disclosure also provides an approach for modifying the kernel by creating a custom translation lookaside buffer (TLB) and implementing virtual shared memory between an application running on a guest CPU of a VM and the kernel workload running on a CA of the host. An approach is also provided for setting up the kernel and its working set on a CA, executing the workload, suspending the workload, and then resuming the workload at a later time.

Figure 1A:
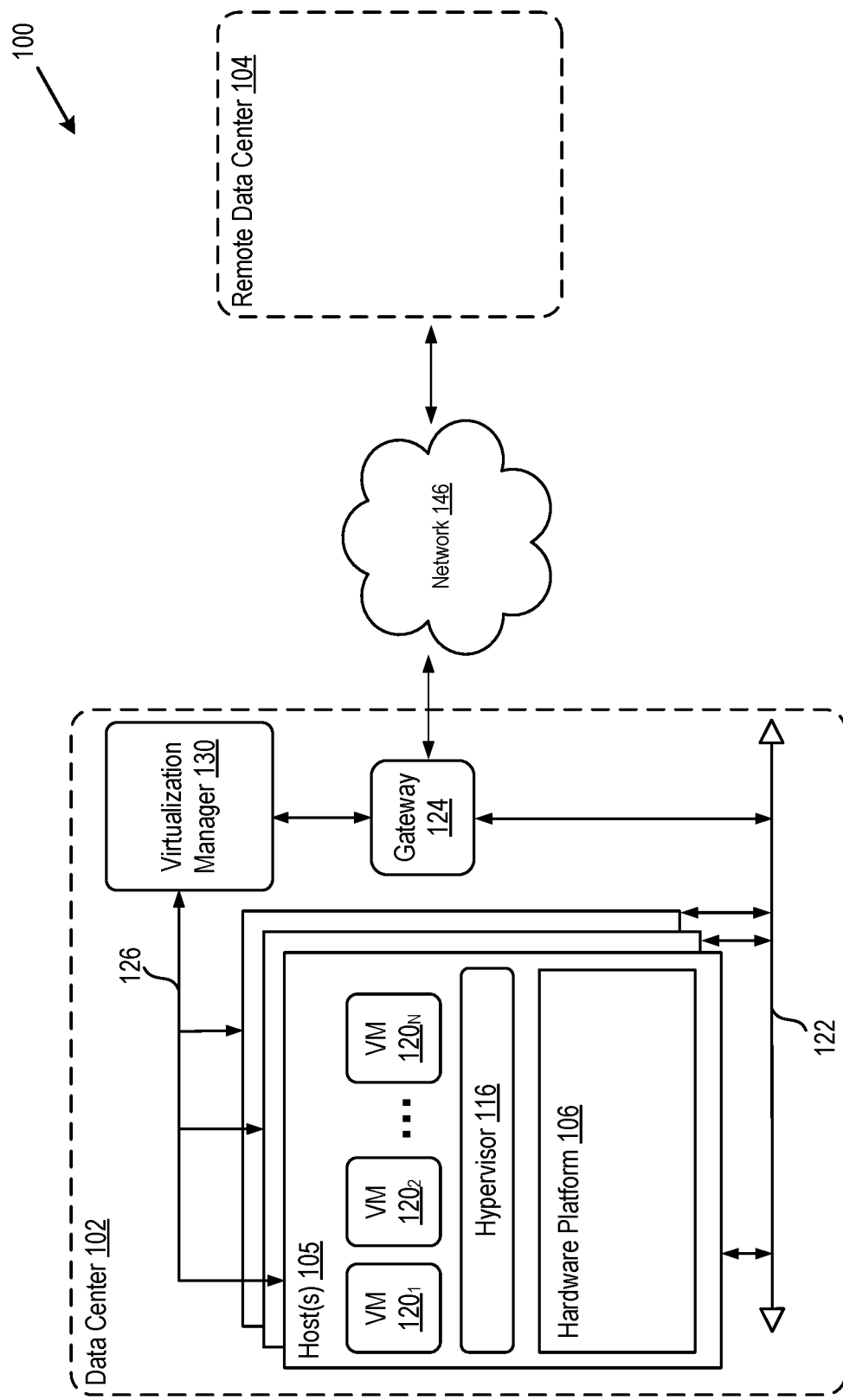
FIG. 1A depicts a block diagram of a computer system in which one or more embodiments of the present disclosure may be utilized, according to an embodiment.

FIG. 1A depicts a block diagram of a computer system 100 in which one or more embodiments of the present disclosure may be utilized, according to an embodiment. As shown, computer system 100 includes data center 102 and a remote data center 104, connected by a network 146. Remote data center 104 may be substantially similar to data center 102. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, and a data network 122. Each of hosts 105 may be constructed on a server grade hardware platform 106, such as an x86 architecture platform. For example, hosts 105 may be geographically co-located servers on the same rack. Host 105 is configured to provide a virtualization layer, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. One example of a hypervisor 116 that may be used is a VMware ESXi™ hypervisor provided as part of the VMware vSphere® solution made commercially available from VMware, Inc. of Palo Alto, Calif. Hypervisor 116 may run on top of the operating system in host 105 or directly on hardware platform 106 of host 105.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc.

In one embodiment, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In one implementation, hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

Gateway 124 (e.g., executing as a virtual appliance) provides VMs 120 and other components in data center 102 with connectivity to network 146 used to communicate with remote data center 104. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Although networks 122 and 126 are shown as separate entities, they may be implemented by shared physical networking components.

Figure 1B:
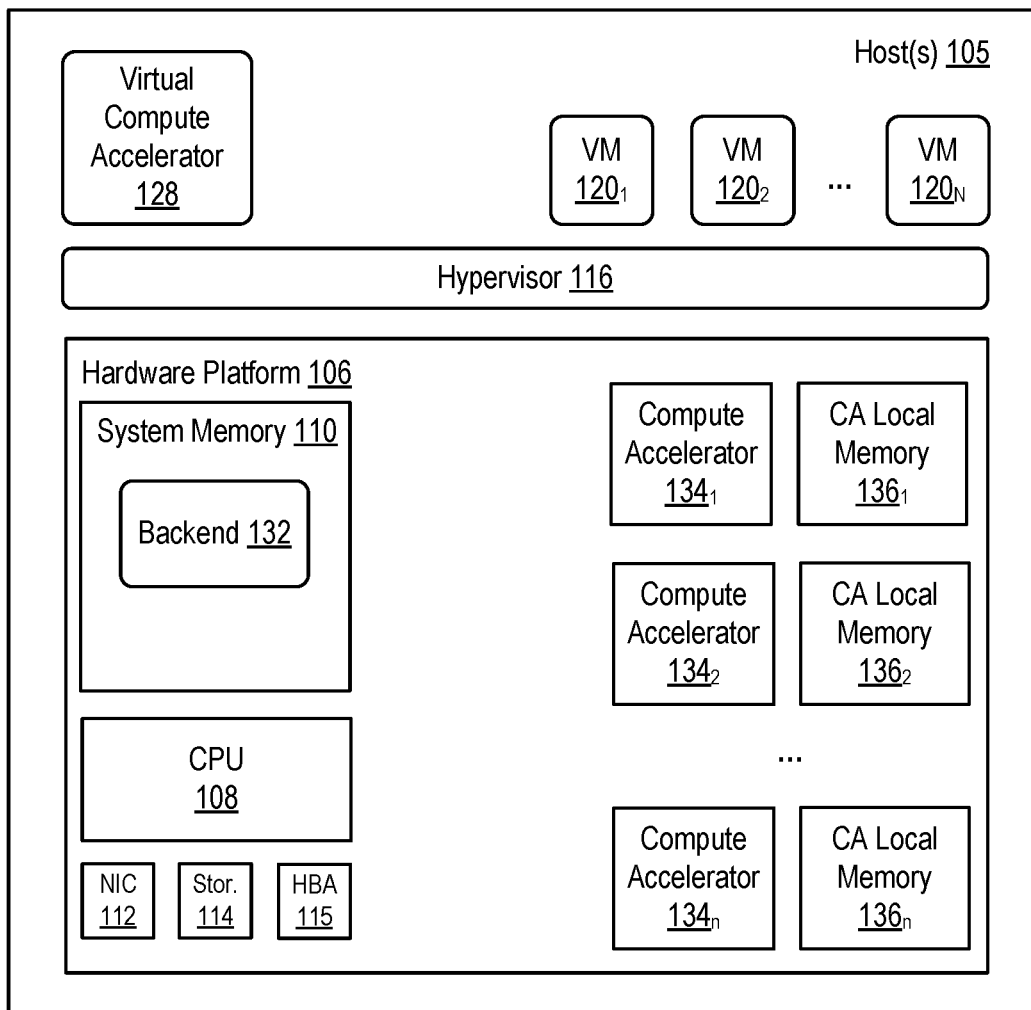
FIG. 1B is an expanded view of a host computer, showing a virtual compute accelerator and extra detail of the hardware platform of the host computer, according to an embodiment.

FIG. 1B is an expanded view of host 105, showing a virtual compute accelerator 128 and extra detail of hardware platform 106, according to an embodiment. Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). Hardware platform 106 also includes one or more CAs $134_1$ to $134_N$ (collectively referred to as CAs 134 and individually referred to as CA 134), with each CA having its own local memory 136, the CA local memory 136 typically located on the same compute accelerator card as CA 134.

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory. In an embodiment, memory 110 includes the software module backend 132. In another embodiment, backend 132 is a module within hypervisor 116. Backend 132 is further discussed with reference to FIG. 1D, below.

Hardware platform 106 includes one or more CAs 134, with each CA 134 having its own local memory 136, the CA local memory 136 typically located on the same compute accelerator card as CA 134. CA 134 is a specialized type of processor that performs certain specialized mathematical calculations much faster than CPU 108. CA 134 may be, for example, a GPU, FGPA, or DSP. CA 134 may be a peripheral device that accelerates mathematical operations, submitted through compute kernel 142 (see FIG. 1C) by application 140 run on CPU 108. CA 134 is programmed through a CA API (e.g. OpenCL, DirectCompute, Vulkan) to give application 140 a high-level interface for submitting compute kernel 142 for execution on a particular working set. CA 134 may have many, e.g., hundreds or thousands, of processor cores (not shown). Each core of CA 134 may execute, in parallel, a piece of code called a compute kernel, further discussed below with reference to FIG. 1C. Each CA 134 may communicate with system memory 110 through a connection such as a peripheral component interconnect express (PCIe) bus. In an embodiment, connection between each CA 134 and system memory 110 is relatively slower than the connection between each CA 134 and its respective CA local memory 136. In another embodiment, CA 134 may be integrated within CPU 108, allowing CA 134 to access system memory 110 at a substantially equal speed as accessing CA local memory 136.

Some notable differences between CA 134 and CPU 108 are as follows. CA 134 usually executes workloads submitted through a command queue and threading is an implied characteristic of the CA programming model. However, threading on CPU 108 usually must be explicitly programmed. For example, architecturally, CPU 108 is composed of just few cores with lots of cache memory that can handle a few software threads at a time. In contrast, CA 134 may be composed of hundreds of cores that can handle thousands of threads simultaneously. CA 134 is programmed through CA APIs, and does not execute CPU instruction sets or operating system binaries or machine code. Internal state of CA 134 is therefore not visible to a compute kernel 142 (see FIG. 1C) or application 140 (see FIG. 1C), whereas instruction sets of CPU 108 expose significant portions of internal state of CPU 108 to higher privilege CPU modes.

Further, CA 134 applies a set of algorithms (written in compute kernels) to a working set for generating a result. CA 134 does not manage active binaries of an operating system stack and does not interact with operating system services (e.g., a file system). CPU 108 controls the execution flow of an operating system, while CA 134 does not; that is, CPU 134 does not spawn processes from compute kernel 142 or throw interrupts. CA 134 has dedicated local memory 136 that is different from local memory of CPU 108 (i.e., system memory 110). When CA 134 performs an out-of-bounds read, the returned value is usually a predetermined default value for the API of CA 134, whereas CPU 108 would throw an exception that must be handled. CA 134 relies on CPU 108 to submit compute kernel 142 to CA 134. Also, CA 117 is a specialized processor, so CA 117 may have a reduced instruction set compared to CPU 108. A reduced instruction set reduces the attack surface of a processor, making CA 117 more secure and more able to withstand malicious attacks, as compared to CPU 108.

FIG. 1B also shows virtual CA 128 running as a software module on host 105. Virtual CA 128 abstracts CAs 134 into a single device visible to applications that are running on VM 120 or host 105. That is, host 105 may have several physical CAs 134 available for CA workloads, but the CAs 134 may be abstracted so that an application sees only one CA device available to it on host 105. The abstraction of multiple CAs 134 into a single virtual device is accomplished by virtual CA 128. Virtual CA 128 manages division of work required by an application among physical CAs 134, as further explained with reference to FIG. 1D, below.

Figure 1C:
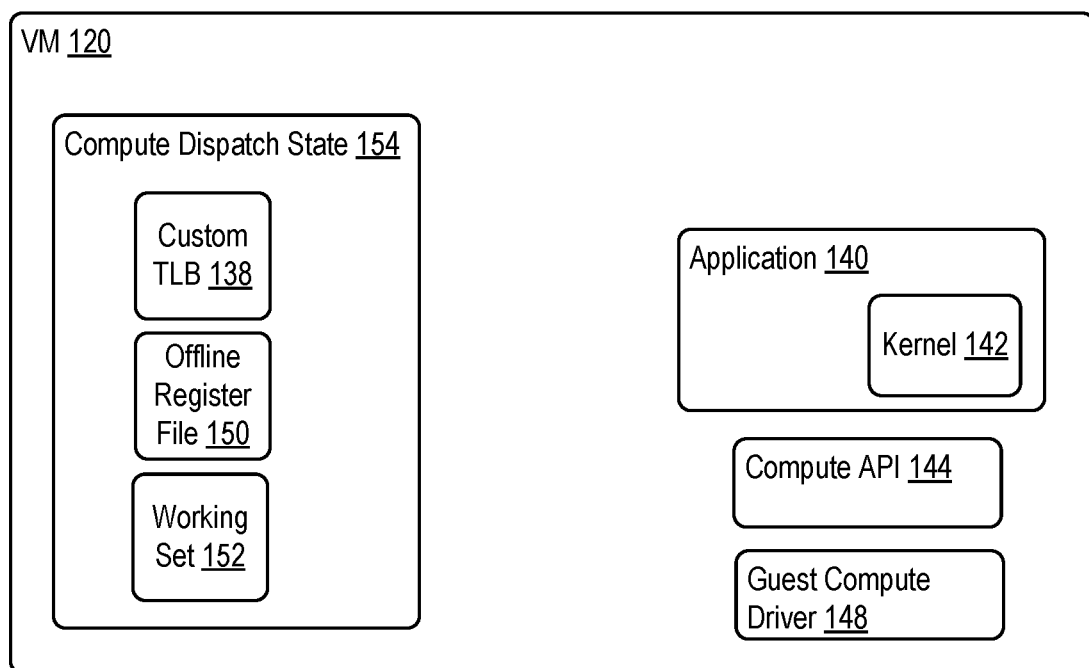
FIG. 1C depicts a block diagram of a virtual machine, showing software modules executing on the virtual machine and data files maintained by the virtual machine for execution of a CA workload, according to an embodiment.

FIG. 1C depicts a block diagram of a VM 120, showing software modules executing on VM 120 and data files maintained by VM 120 for execution of a CA workload, according to an embodiment. The software modules are shown on the right and include application 140, kernel 142, compute application programming interface (API) 144, and guest compute driver 148. The data files are shown on the left and include custom TLB 138, offline register file 150, and working set 152. Custom TLB 138, offline register file 150, and working set 152 comprise compute dispatch state 154. Compute dispatch state 154 is a subset of the compute state at the point of dispatch or execution of compute kernel 142. Compute dispatch state 154 is programmed by application's 140 usage of the CA API. Compute dispatch state 154 consists of the active working set 152, the references to memory backing or containing the working set (custom TLB 138), and the CA configuration (not shown) to be used during execution of compute kernel 142. As used herein, the term "dispatch" may mean the start of execution of kernel 142 on CA 136. The data files and software modules may be located in the portion of system memory 110 reserved for VM 120. Application 140, compute API 144, and guest compute driver 148 are running on CPU 108. At the time of execution of kernel 142, kernel 142 may be present within CA local memory 136 and executing on CA 134.

VM 120 includes application 140. Application 140 may be any type of application designed for any purpose. As part of its execution, application 140 has a function or module that is designed to run on CA 134. The function or module is compute kernel 142. Compute kernel 142 is a small set of functions that acts on an input (e.g., a working set) and contributes to an output. Compute kernel 142 is isolated to execution on CA 134 for the purpose of accelerating certain tasks required by application 140 running on CPU 108. An instance of compute kernel 142 is typically a thread. An instance of compute kernel 142 (e.g., a thread) cannot spawn threads, processes, or throw interrupts. On the other hand, application 140 running on CPU 108 may spawn threads, processes, or throw interrupts.

For example, the application 140 may be a financial calculator that has a neural network component. As part of the boot process of host 105, the financial calculator may open and then train a neural network on the latest financial data retrieved from the internet that morning. The training of the neural network may be accomplished by compute kernel 142 of application 140. The neural network may be trained on a data file, which is shown as working set 152 in FIG. 1C. Working set 152 is the data on which compute kernel 142 performs its operations. For example, working set 152 may contain the latest financial data to train a neural network, or it may contain a matrix for transposition. In an embodiment, compute kernel 142 may be executed on CPU 108, but is designed to preferably be executed on CA 134.

Compute API 144 is an API exposed to application 140 to communicate with CA 134, or with what application 140 perceives as the CA available to it on host 105, such as virtual CA 128. Compute API 144 may be a standard compute accelerator API known in the art, such as OpenCL, DirectCompute, CUDA, or Vulkan. Compute API 144 may also be a proprietary API. Compute API 144 works together with guest compute driver 148 to communicate with virtual CA 128. That is, guest compute driver 148 may be a plug-in to compute API 144, the plugin allowing the standard compute API 144 to work with a virtualized compute accelerator rather than a physical CA. In an embodiment, guest compute driver 148 is a software module located in hypervisor 116.

VM 120 also includes offline register file 150 and custom TLB 138. Offline register file 150 is used to store values of variables of kernel 142 after suspending a CA workload, and thereafter, to restore the values of variables of kernel 142 upon a resume of the CA workload. The variable values allow a CA workload to resume at a later time from the point of execution at which the workload was suspended. Custom TLB 138 stores translations of select virtual addresses (VAs) from operating system of VM 120 to VAs of operating system of host 105. During execution of kernel 142 on CA 134, offline register file may be accessible to both CPU 108 and CA 134. During execution of kernel 142 on CA 134, offline register file 150 may be located on CA local memory 136. Offline register file 150 and custom TLB 138 are discussed in further detail below with reference to FIG. 3 and FIG. 4, respectively.

Figure 1D:
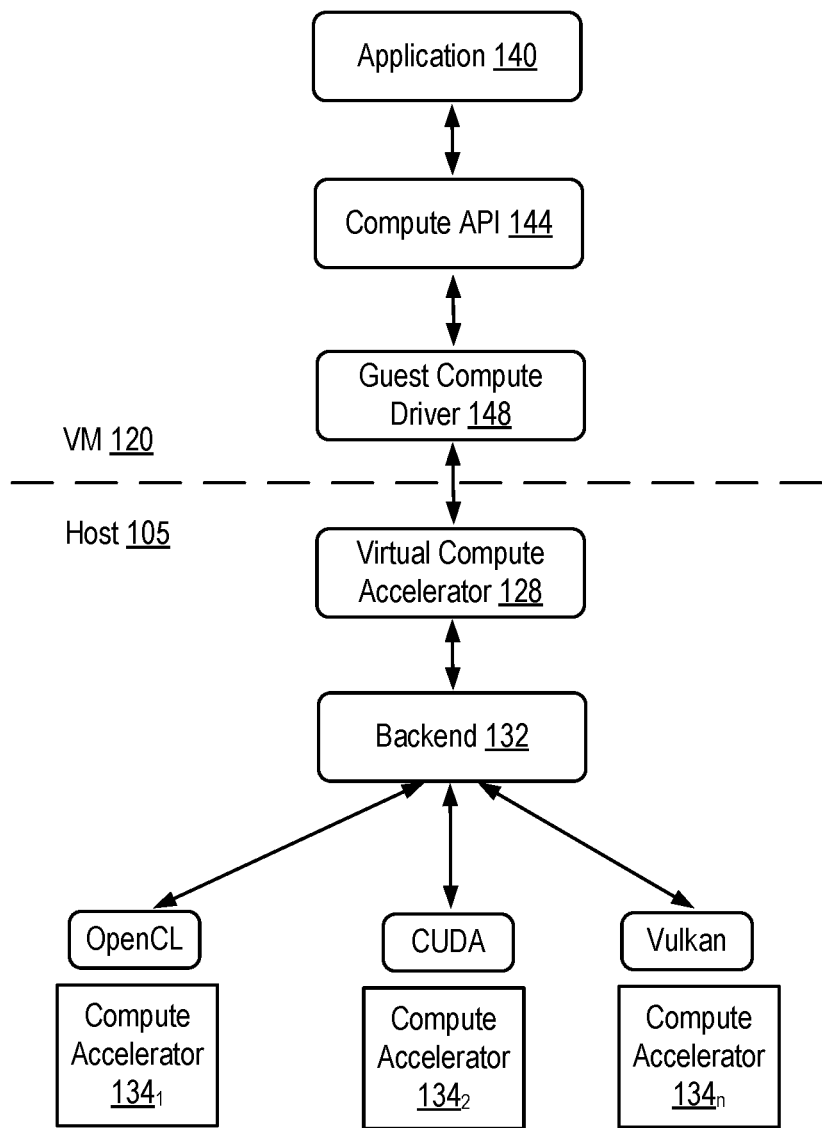
FIG. 1D depicts a block diagram of a data flow between a guest application and one or more compute accelerators, according to an embodiment.

FIG. 1D depicts a block diagram of a data flow between a guest application 140 and physical CAs 134 running on host 105, according to an embodiment. Application 140 is a "guest" application because it is running on VM 120, which is a guest machine on host computer 105. The data flow shown in FIG. 1D illustrates the abstraction and/or virtualization of CA 134, so that application 140 perceives a single compute accelerator device with which it can communicate using a single compute accelerator API. Application 140 may send a command to what it perceives to be a physical CA 134, and that command may be, for example, to reserve a certain amount of CA local memory 136 for the execution of a CA workload.

A command from application 140 will be transmitted to compute API 144, and the command may be formatted in a way recognizable by compute API 144 and. Compute API 144 may also keep a list of active elements of the working set and perform semantic checks on the incoming command. Compute API will then transmit the command to guest compute driver 148. Guest compute driver 148 modifies the command as needed to work with virtual CA 128. For example, guest compute driver 148 may translate between compute API 144 to the protocol of virtual CA 128, if the two protocols are different or if the command format is not support by virtual CA 128. Guest compute driver 148 may also translate working set element names from compute API 144 to the elements' associated names on virtual CA 128.

Virtual CA 128 interprets the command and divides up the request among CAs 134 available on host 105. For example, in preparation for executing kernel 142 on several CAs 134 of host 105, virtual CA 128 may replicate the command and transmit one to each CA 134 available on host 105. The replication may result in a reservation of memory on each of CA local memory $136_1$ to $136_N$. If the command had been, for example, to set up compute kernel 142, then virtual CA 128 may divide up the anticipated CA workload evenly between physical CAs 134, such as by assigning a portion of working set 152 to each CA 134. For example, for a transpose operation on a matrix to be performed on four CAs 134, virtual CA 128 may divide up CA workload such that each CA 134 executes kernel 142 on one-fourth of the matrix. Afterwards, CA 128 may combine the results of each CA 134 that performed the transpose workload into a single results/solution matrix.

In an embodiment, application 140 may send all commands needed to start and complete a CA workload in a command buffer, which may be a queue from which commands are extracted and executed in a first-in-first-out (FIFO) order. Such a command buffer may be received by virtual CA 128. Virtual CA 128 extracts each command in the buffer one by one, analyzes, divides up between CAs 134 as needed, and transmits to backend 132 for protocol translation.

Commands from virtual CA 128 are transmitted to backend 132. Backend 132 is a protocol translator. Each of CAs 134 available on host 105 may be of a different type and architecture, originating from a different manufacturer, and using a different CA API. Rather than requiring application 140 or virtual CA 128 to issue or retransmit commands in different APIs, all commands are initially formatted as required by compute API 144 until they are optionally translated into the CA API of virtual CA 128 by guest compute driver 148, and then again translated to CA API of each CA 134 by backend 132.

When backend 132 receives a command from virtual CA 128, backend 132 then analyzes the command, compares the format of the command to the API of the destination CA 134, and if the formats do not match, backend 132 translates the command from compute API 144 into the target API. The target API may be, for example, OpenCL, CUDA, Vulkan, DirectCompute, or a proprietary API. One example of a protocol translator is the VMware vSGA product made available from VMware, Inc. Protocol translation may be accomplished by methods known in the art, such as the method described in "GPU Virtualization on VMware's Hosted I/O Architecture," by Micah Dowty and Jeremy Sugerman, published in 2008.

Each CA 134 that is to execute CA workload of kernel 142 may receive an instruction from virtual CA 128 to perform only a portion of the CA workload of kernel 142. Upon receiving kernel 142 and working set 152, each CA 134 may further subdivide its portion of CA workload among its many compute cores. In an embodiment, each CA 134 is its own thread, with each thread having a thread ID assigned by CA 134. In another embodiment, each computing core of CA 134 is its own thread, with each thread having a thread ID assigned by CA 134.

Figure 2:
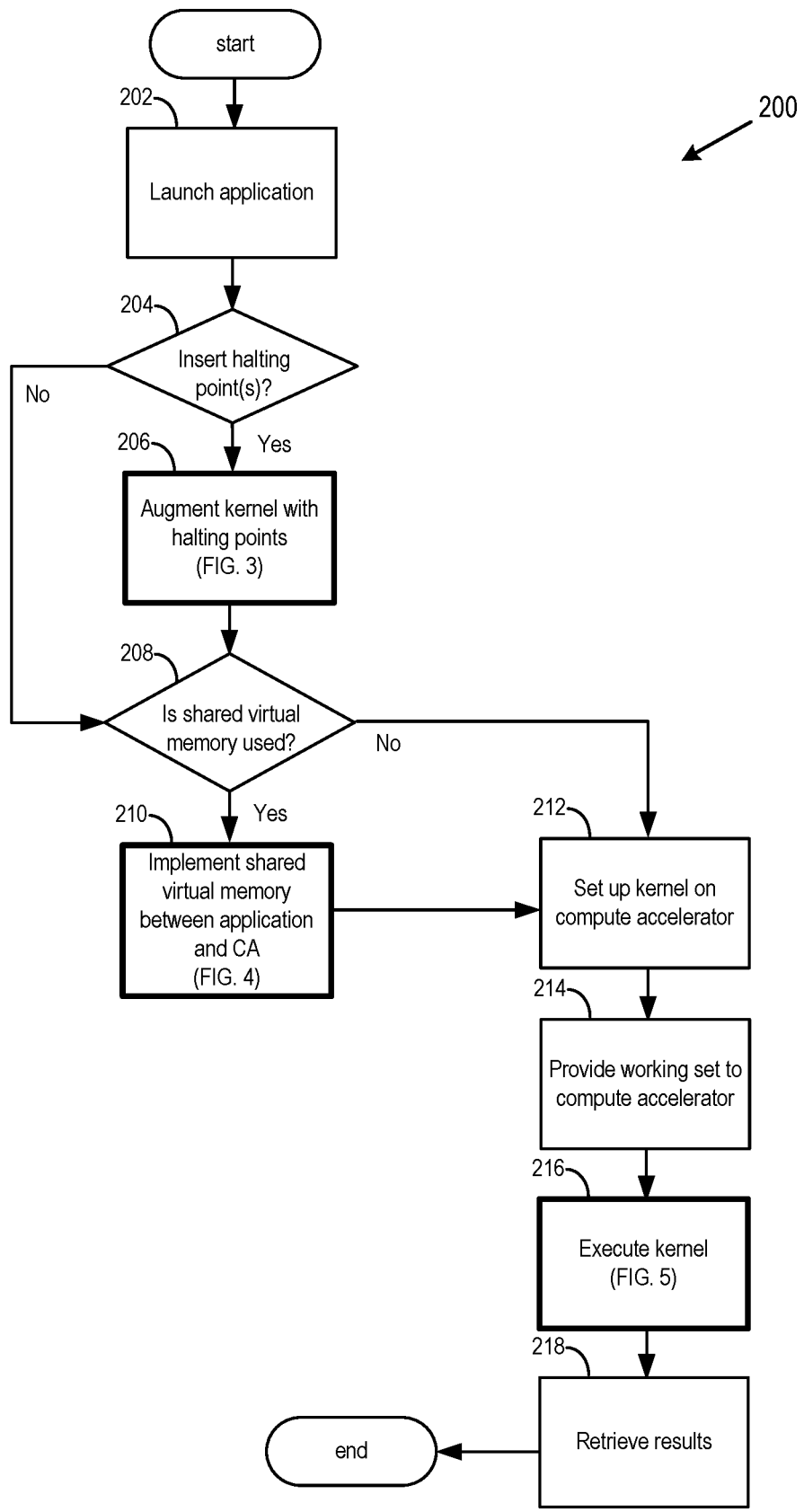
FIG. 2 depicts a flow diagram of a method of performing a compute accelerator workload that is capable of being suspended before completion and resumed at a later time, according to an embodiment.

FIG. 2 depicts a flow diagram of a method 200 of performing a compute accelerator workload that is capable of being suspended before completion and resumed at a later time, according to an embodiment. Method 200 describes a way of performing a CA workload that allows a user or a program to pause the workload in the middle of its execution and then to resume the workload from the point at which it was stopped. Such an approach is advantageous because it avoids the need to start a CA workload from the beginning if the workload must be stopped for any reason. This approach allows scheduling of higher priority CA workloads while a low priority CA workload is running, and migration of a CA workload between hosts for load balancing or fault tolerance. Steps 202 through 210 are performed by CPU 108, while steps 212, 214 and 218 are performed by both CPU 108 and CA 134 working together. In an embodiment, step 216 is performed solely by CA 134. In another embodiment, step 216 is performed by both CPU 108 and CA 134, meaning that kernel 142 executes on both CA 134 and CPU 108.

At step 202, application 140 is launched by CPU 108. The launching may be done, for example, by double clicking a shortcut on a desktop by an administrator, with the clicking operation being processed and executed by CPU 108. Alternatively, application 140 may be launched automatically, such as by a call to CPU 108 from another application or as part of a boot process of host computer 105. Application 140 includes compute kernel 142, designed to be executed on CA 134.

At step 204, a determination is made as to whether kernel 142 should be augmented with conditional halting points that allow a CA workload to be suspended and then restarted. The determination at step 204 may be accomplished by querying a user or administrator regarding whether the CA workload of application 140 should have suspend/resume capabilities. The determination may also be accomplished by analyzing kernel 142 and its working set 152 to estimate duration of CA workload, and then subsequently augment kernel 142 if the estimated duration is above a threshold. The querying of a user or the analysis of kernel 142 may be performed by application 140 via CPU 108, or it may be performed by another application that scans executing applications for the presence of kernel 142 and performs kernel augmentation, if needed. If conditional halting points are to be inserted into kernel 142, then method 200 proceeds to step 206. If conditional halting points are not to be inserted into kernel 142, then method 200 skips step 206 and proceeds to step 208.

Figure 3:
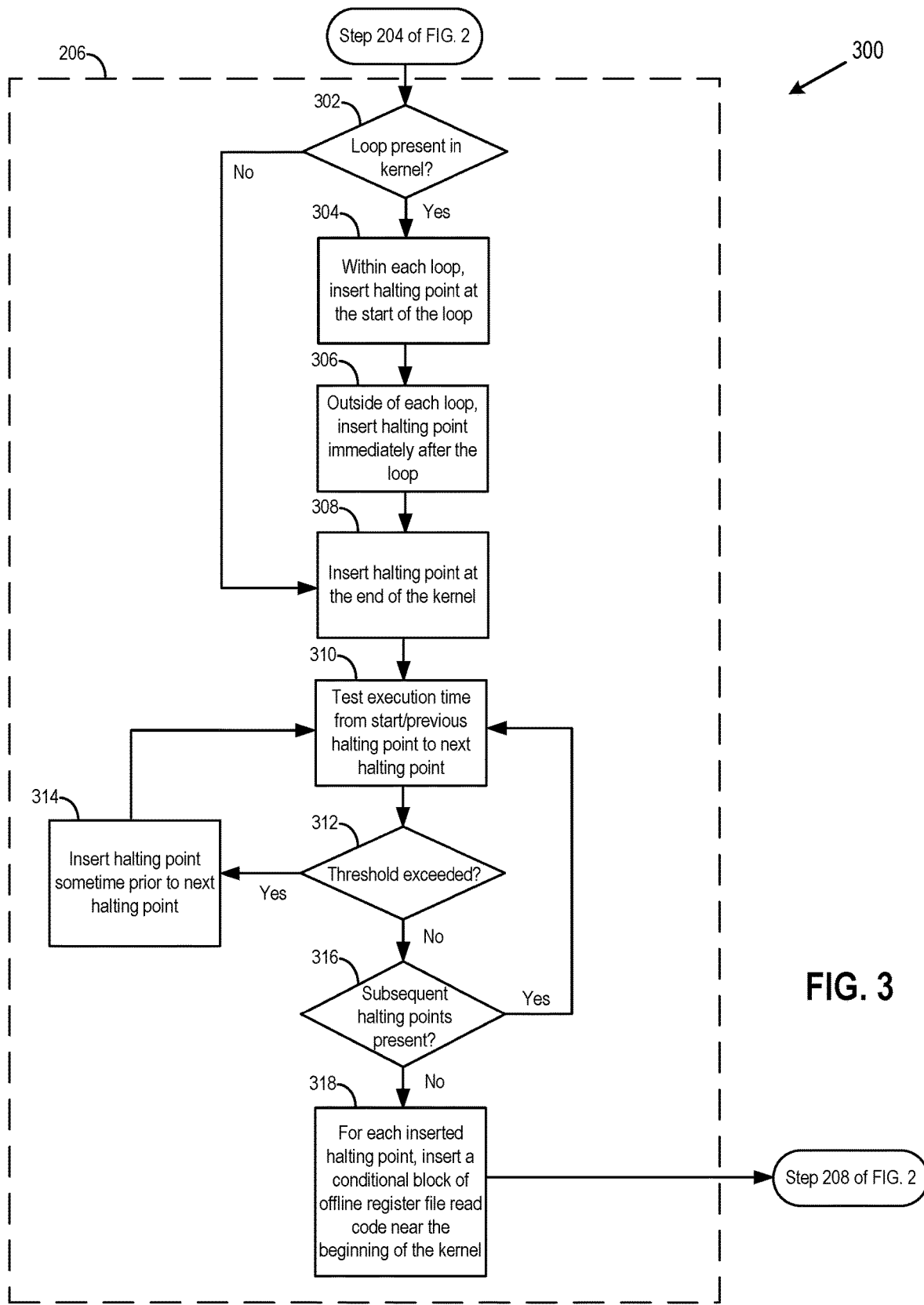
FIG. 3 depicts a flow diagram of a method of augmenting a kernel with conditional halting points, according to an embodiment.

FIG. 3 depicts a flow diagram of a method 300 of augmenting kernel 142 with conditional halting points, as per step 206 of FIG. 2, according to an embodiment. Method 300 of FIG. 3 is an expanded view of step 206 of FIG. 2. Method 300 is one possible approach to inserting conditional halting points within kernel 142. Other approaches, consistent with the teachings herein, are possible and may be substituted for step 206 of FIG. 2. In an embodiment, method 300 is performed by backend 132 before backend 132 translates a command containing a reference to kernel 142 to the API of CA 134. In another embodiment, method 300 is performed by application 140 or by another application that scans executing applications for the presence of kernel 142 and then augments kernel 142 if needed.

For clarity of explaining method 300, the below pseudo-code for an exemplary kernel will be used as kernel 142 for illustrating the steps of method 300. The exemplary kernel (kernel 142) finds the transpose of matrix A and stores the solution in matrix B.

---
Code Segment 1
---
```
kernel_transpose(matrix A, matrix B)
{
    thread_id = get_global_id( );
    int row, col;
    for (row = 0; row < A.rows; row++)
    {
        for (col = 0; col < A.cols; col++)
        {
            B[col][row] = A[row][col];
        }
    }
}
```

At step 302, a determination is made as to whether kernel 142 contains loop(s). Kernel 142 almost always contains loops, so method 300 is likely to continue to step 304 after step 302. If kernel 302 does not contain loops, method 300 continues to step 308.

At step 304, a conditional halting point is inserted within each loop, at the start of the loop. A "halting point" or "conditional halting point," as used herein, consists of three elements, each of which is explained further below: (1) a bookmark (e.g., a program counter) within offline register file 150, (2) a label within kernel 142, and (3) a halting predicate, which is a block of code that executes conditionally depending on the value of a halt variable. After insertion of a conditional halting point at the beginning of the first for-loop, the exemplary kernel appears as follows, with the bolded lines showing the newly-added lines of code.

---
Code Segment 2
---
```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] == TRUE)
        {
            // write kernel variables and halting point number
            // to offline register file
            return;
        }
        for (col = 0; col < A.cols; col++)
        {
            B[col][row] = A[row][col];
        }
    }
}
```

The value of the bookmark variable within offline register file 150 is set by the first bolded line in the exemplary kernel above, specifically by the line "registerFile [thread_id*MAX_REGISTERS+BOOKMARK_OFFSET]=1." Offline register file 150 is shared by all threads executing kernel 142. Therefore, each thread may only use a portion of offline register file 150, and each thread is configured not to overwrite data specific to other threads that are executing kernel 142.

An index within offline register file 150 is calculated by adding the bookmark offset to the point in offline register file 150 where data for thread_id begins. The point where data for thread_id begins within offline register file 150 is calculated by multiplying thread_id by MAX_REGISTERS. MAX_REGISTERS is the number of registers or saved variables, per thread, in compute kernel 142. It should be noted that at the time of execution of kernel 142, a copy of offline register file 150 may be placed within CA local memory 136 of each CA 134 executing the kernel. This will allow fast access to offline register file 150 by each CA 134. Due to multiple copies of offline register file 150 being located at the various CA local memories 136, virtual CA 128 may implement a synchronization/coherence mechanism that resolves conflicts, at required time points, between data within the various copies of offline register file 150 present among CA local memories 136.

The first bolded line above, "registerFile [thread_id*MAX_REGISTERS+BOOKMARK_OFFSET]=1," sets the bookmark value within offline register file 150 to "1," which means that the data that is stored within offline register file 150 for the thread with id of "thread_id" pertains to halting point 1 within kernel 142. As used herein, the term "bookmark value" means value of the bookmark variable being discussed. If, for example, kernel 142 is suspended at halting point 1 (as shown created above in Code Segment 2), then upon resuming kernel 142, the application managing the resume operation will know that the data for thread of thread_id pertains to the portion of kernel 142 marked by halting point 1. It should be noted that by default, bookmark value within offline register file 150 is zero.

The second bolded line of Code Segment 2 above, "halting_point_label1:," creates a label within kernel 142 for halting point 1. When kernel 142 is resumed after having been halted at halting point 1, kernel 142 jumps to the label of the halting point at which the CA workload or kernel 142 was suspended. The jump or "goto" instruction is inserted into kernel 142 in step 318 of method 300, below.

The rest of the bolded lines of Code Segment 2 represent the halting predicate. The halting predicate begins with a conditional statement in the form of an if-statement: "if (registerFile[thread_id*MAX_REGISTERS+HALT_OFFSET]==TRUE)." The conditional statement tests whether the halt variable within offline register file 150 has been set to true. If so, that means that a suspend command for this CA workload has been issued, such as by a system administrator or by another application. Although the indexing into offline register file 150 in the above line is written as though a separate halt variable exists for each thread executing kernel 142, the halt variable may instead be a single variable stored at a single location of offline register file 150. In an embodiment in which a separate halt variable exists for each thread executing kernel 142, a suspend/resume command changes all halt variable values within offline register file 150, for all threads executing kernel 142.

At the time of execution of kernel 142, if the above conditional line of the halting predicate evaluates to true, then all variable values of kernel 142 are written to offline register file 150 and CA workload of kernel 142 is suspended, to be resumed later. For example, in the exemplary kernel of Code Segment 2, the values of variables "row" and "col" would be recorded within offline register file 150. The "return" line within the halting predicate causes kernel 142 to cease execution.

To complete step 304 with regards to the exemplary kernel above, a second conditional halting point is inserted at the beginning of the second for-loop, within that second for-loop. After insertion of this second halting point, the exemplary kernel would appear as show below in Code Segment 3, with the code for the second halting point being in bold font. Halting point 2 functions substantially the same as halting point 1. As shown, the bookmark value has been set to 2 in the first bolded line, and the label "halting_point_label2" has the number "2" in it to indicate that this label is for the second halting point. After step 304, method 300 continues to step 306.

---
Code Segment 3
---

```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] == TRUE)
        {
            // write kernel variables and halting point number
            // to offline register file
            return;
        }
        for (col = 0; col < A.cols; col++)
        {
            // halting point 2
            registerFile[thread_id*MAX_REGISTERS+BOOKMARK_OFFSET] = 2;
            halting_point_label2:
            if(registerFile[thread_id * MAX_REGISTERS + HALT_OFFSET] ==
            TRUE)
            {
                // write kernel variables and halting point number
                // to offline register file
                return;
            }
            B[col][row] = A[row][col];
        }
    }
}
```

At step 306, a halting point is inserted outside of each loop, immediately after each loop. The halting points at step 306 function substantially the same as halting points of step 304 above. The exemplary kernel, after completion of step 306, appears as shown in Code Segment 4, below, with the newly added halting points 3 and 4 being shown in bolded font.

---
Code Segment 4
---

```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] == TRUE)
        {
            // write kernel variables and halting point number
            // to offline register file
            return;
        }
        for (col = 0; col < A.cols; col++)
        {
            // halting point 2
            registerFile[thread_id*MAX_REGISTERS+BOOKMARK_OFFSET] = 2;
            halting_point_label2:
            if(registerFile[thread_id * MAX_REGISTERS + HALT_OFFSET] ==
            TRUE)
            {
                // write kernel variables and halting point number
                // to offline register file
                return;
            }
            B[col][row] = A[row][col];
        }
        // halting point 3
        registerFile[thread_id * MAX_REGISTERS + BOOKMARK_OFFSET] =
        3;
        halting_point_label3:
        if(registerFile[thread_id * MAX_REGISTERS + HALT_OFFSET] ==
        TRUE)
        {
            // write kernel variables and halting point number
            // to offline register file
            return;
        }
    }
    // halting point 4
    registerFile[thread_id * MAX_REGISTERS + BOOKMARK_OFFSET] = 4;
    halting_point_label4:
    if(registerFile[thread_id * MAX_REGISTERS + HALT_OFFSET] == TRUE)
    {
        // write kernel variables and halting point number
        // to offline register file
        return;
    }
}
```

At step 308, a halting point is inserted at the end of kernel 142. The halting point at step 308 functions substantially the same as halting points of step 304 above. The exemplary kernel, after completion of step 308, appears as shown in Code Segment 5, below, with the newly added halting point 5 being shown in bolded font. As can be seen at the bottom of Code Segment 5, step 308 results in a redundant halting point that allows suspension of CA workload of kernel 142 at the same time point as halting point 4. Because of this, step 308 of method 300 is optional.

---
Code Segment 5
---

```
kernel_transpose(matrix A, matrix B)
{
    thread_id = get_global_id( );
    int row, col;
```

-continued

Code Segment 5

```
for (row = 0; row < A.rows; row++)
{
    // halting point 1
    registerFile[thread_id * MAX_REGISTERS + BOOKMARK_OFFSET] = 1;
    halting_point_label1:
    if(registerFile[thread_id * MAX_REGISTERS + HALT_OFFSET] == TRUE)
    {
        // write kernel variables and halting point number
        // to offline register file
        return;
    }
    for (col = 0; col < A.cols; col++)
    {
        // halting point 2
        registerFile[thread_id*MAX_REGISTERS+BOOKMARK_OFFSET] = 2;
        halting_point_label2:
        if(registerFile[thread_id * MAX_REGISTERS + HALT_OFFSET] ==
        TRUE)
        {
            // write kernel variables and halting point number
            // to offline register file
            return;
        }
        B[col][row] = A[row][col];
    }
    // halting point 3
    registerFile[thread_id * MAX_REGISTERS + BOOKMARK_OFFSET] = 3;
    halting_point_label3:
    if(registerFile[thread_id * MAX_REGISTERS + HALT_OFFSET] == TRUE)
    {
        // write kernel variables and halting point number
        // to offline register file
        return;
    }
}
// halting point 4
registerFile[thread_id * MAX_REGISTERS + BOOKMARK_OFFSET] = 4;
halting_point_label4:
if(registerFile[thread_id * MAX_REGISTERS + HALT_OFFSET] == TRUE)
{
    // write kernel variables and halting point number
    // to offline register file
    return;
}
// halting point 5
registerFile[thread_id * MAX_REGISTERS + BOOKMARK_OFFSET] = 5;
halting_point_label5:
if(registerFile[thread_id * MAX_REGISTERS + HALT_OFFSET] == TRUE)
{
    // write kernel variables and halting point number
    // to offline register file
    return;
}
}
```

Steps 310 through 316 of method 300 are optional. Steps 310 through 316 perform a timed test of execution of kernel 142 to see if the time period to reaching halting points is above a threshold. For example, it may be desirable to be able to suspend a CA workload within at most, e.g. ten second, one minute, five minutes, thirty minutes, or one hour after the suspend command is issued. If the time gap between halting points is larger than the threshold, then more time than desirable may elapse after a decision to suspend occurs. In order to test execution time from one halting point to the next halting point, or from launch of kernel 142 to the first halting point, kernel 142 and working set 152 may be set up on CA 134. Thus, before performing steps 310 through 316, steps 212 and 214 of FIG. 2 may need to be performed. In order to test execution time to a halting point, the halt variable within offline register file 150 may need to be set to true. Also, more than one halt variable may need to be created within offline register file 150 for the purposes of the testing, e.g., one halt variable for each halting point within kernel 142 may need to be created within offline register file 150.

At step 310, the first time that step 310 is reached within method 300, execution time of kernel 142 is timed from launch until the first halting point. In an embodiment, the execution may be on a single CA 134, or on a single core of a single CA 134. At step 312, the time elapsed is compared to a threshold. If time elapsed exceeds the threshold time, then method 300 continues to step 314. Otherwise, method 300 continues to step 316.

At step 314, another halting point is inserted sometime prior to the first halting point, such as for example, midway between the launch and the first halting point. A "midway" point may be measured by number of lines of code, with the loops in kernel 142 being rolled or unrolled. If a loop is "unrolled," this means that a loop that consists of five lines of code but is executed 10 times is treated as fifty lines of code.

After step 314, method 300 returns to step 310 and tests execution time from launch to the newly created halting point of step 314, and then at step 312 compares time elapsed to the threshold time. Method 300 continues to add halting points between the two points being compared until time elapsed is below the threshold time. If time elapsed is below threshold time, method 300 continues to step 316.

At step 316, method 300 determines whether more halting points are present in kernel 142. If so, method 300 returns to step 310 to test execution time between the next halting point and the halting point immediately preceding it. When determining whether more halting points are present in step 316, loops may be rolled or unrolled, as preferred in the test implementation. For example, if a loop containing one halting point is to be executed one thousand times, that loop may be unrolled and be treated as containing one-thousand consecutive halting points.

The method continues through steps 312 and 314 for the two halting points chosen at step 316 (next halting point and the halting point immediately preceding it) in substantially the same manner as for the analysis from starting point to first halting point of kernel 142, described above. When time between all adjacent/consecutive halting points is below threshold, method 300 proceeds from step 316 to step 318.

At step 318, the beginning of kernel 142 is modified for the purpose of a resume operation on kernel 142. When resumed, CA workload of kernel 142 begins at the same point of execution at which it stopped. To accomplish this, variable values of kernel 142 are read from offline register file 150, and then execution of kernel 142 jumps to the halting point label within the code of kernel 142 at the halting point at which execution was suspended.

At step 318, for each halting point inserted in kernel 142, a read predicate is inserted for reading in values of variables of kernel 142, and for jumping to the appropriate line of code of kernel 142. For the purpose of step 318, a halting point is counted only once for each appearance in kernel 142, with loops remaining in a "rolled" state. That is, if a loop contains one halting point and the loop is executed one-hundred times, the halting point counts as a single halting point within kernel 142, not as one-hundred halting points.

Code Segment 6 below shows the addition of five read predicates, one for each halting point, within the example kernel. Each of the newly added read predicates is shown in bold font. In an embodiment, the read predicates are added to the beginning of kernel 142, at a point of kernel 142 that comes after reading in a thread id and after declaration of at least some variables of kernel 142.

Code Segment 6

```
kernel_transpose(matrix A, matrix B)
{
    thread_id = get_global_id( );
    int row, col;
    // read predicate 1
    if (registerFile(thread_id * MAX_REGISTERS + BOOKMARK_OFFSET] == 1)
    {
        // read kernel variables from offline register file
        goto halting_point_label1;
    }
    // read predicate 2
    if (registerFile(thread_id * MAX_REGISTERS + BOOKMARK_OFFSET] == 2)
    {
        // read kernel variables from offline register file
        goto halting_point_label2;
    }
    // read predicate 3
    if (registerFile(thread_id * MAX_REGISTERS + BOOKMARK_OFFSET] == 3)
    {
        // read kernel variables from offline register file
        goto halting_point_label3;
    }
    // read predicate 4
    if (registerFile(thread_id * MAX_REGISTERS + BOOKMARK_OFFSET] == 4)
    {
        // read kernel variables from offline register file
        goto halting_point_label4;
    }
    // read predicate 5
    if (registerFile(thread_id * MAX_REGISTERS + BOOKMARK_OFFSET] == 5)
    {
        // read kernel variables from offline register file
        goto halting_point_label5;
    }
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] == TRUE)
        {
            // write kernel variables and halting point number
            // to offline register file
            return;
        }
```

Code Segment 6

```
    for (col = 0; col < A.cols; col++)
    {
        // halting point 2
        registerFile[thread_id*MAX_REGISTERS+BOOKMARK_OFFSET] = 2;
        halting_point_label2:
        if(registerFile[thread_id * MAX_REGISTERS + HALT_OFFSET] ==
        TRUE)
        {
            // write kernel variables and halting point number
            // to offline register file
            return;
        }
        B[col][row] = A[row][col];
    }
    // halting point 3
    registerFile[thread_id * MAX_REGISTERS + BOOKMARK_OFFSET] = 3;
    halting_point_label3:
    if(registerFile[thread_id * MAX_REGISTERS + HALT_OFFSET] == TRUE)
    {
        // write kernel variables and halting point number
        // to offline register file
        return;
    }
}
// halting point 4
registerFile[thread_id * MAX_REGISTERS + BOOKMARK_OFFSET] = 4;
halting_point_label4:
if(registerFile[thread_id * MAX_REGISTERS + HALT_OFFSET] == TRUE)
{
    // write kernel variables and halting point number
    // to offline register file
    return;
}
// halting point 5
registerFile[thread_id * MAX_REGISTERS + BOOKMARK_OFFSET] = 5;
halting_point_label5:
if(registerFile[thread_id * MAX_REGISTERS + HALT_OFFSET] == TRUE)
{
    // write kernel variables and halting point number
    // to offline register file
    return;
}
}
```

As shown, each read predicate first checks the value of the bookmark variable within offline register file. Upon initial launch of kernel 142, before a suspend operation, the default value of the bookmark variable within offline register file 150 is zero. Upon initial launch of kernel 142, the if-statement at the beginning of each read predicate will evaluate to false because the bookmark variable will have a value of zero. However, if kernel 142 had been previously suspended at a halting point, then upon a resume launch of kernel 142, the value of the bookmark variable within offline register file 150 will be equal to the value of the halting point at which kernel 142 was suspended (a non-zero value).

For example, if kernel 142 (or exemplary kernel shown above in Code Segment 6) had been previously suspended at halting point 2, then the value of the bookmark variable within offline register file 150 is equal to 2. The if-statement of read predicate 2 in the example kernel of Code Segment 6 will evaluate to true, and read predicate 2 will execute. Within the body of the code of read predicate 2, value of variables of kernel 142 (e.g., row, col) will be read in from offline register file 150, and execution of kernel 142 (or exemplary kernel) will jump to halting_point_label2, which is a label present at the beginning of the second for-loop and within halting point 2. When the execution of kernel 142 jumps to halting_point_label2, the "row" and "col" variables are not initialized to zero, but instead, the variables retain the values that had been set within read predicate 2 from offline register file 150 before jumping to halting_point_label2.

After step 318, method 300 ends and proceeds to step 208 of FIG. 2. Returning to FIG. 2, after kernel 142 has been augmented with conditional halting points in step 206, method 200 determines whether CA workload of kernel 142 uses shared virtual memory during execution of kernel 142. Shared virtual memory is explained in the following paragraphs.

When application 140 provides working set 152 to CA 134 (via virtual CA 128), a copy of working set 152 may be created and placed on CA local memory 136 of each CA 134 that will be executing kernel 142. However, working set 152 may be very large in size. Sometimes, providing virtual CA 128 and/or CA 134 with a pointer (an address) to the location of working set 152 within system memory 110 is advantageous over creating one or more copies of working set 152. If a pointer to working set 152 within system memory 110 is provided to CA 134, then CA 134 would access working set 152 while working set 152 is located on system memory 110. The accessing of working set 152 by CA 134 may be through a PCIe bus, or the accessing may be much faster if CA 134 is integrated within CPU 108, for example.

Providing a pointer to CA 134 results in shared memory between CPU 108 and CA 134. The pointer provided to CA 134 is in the virtual address space of application 140, which is running on VM 120. Virtual address space of application 140, running on guest OS of VM 120, is likely to differ from the virtual address space of software running on CA 134 (i.e., virtual address space of the operating system of host 105). Thus, the pointer provided to CA 134 may result in an error without translation from virtual address of the guest process that is executing application 140 to virtual address of host process that is executing CA workload of kernel 142 on CA 134. Such a translation may be accomplished by consulting page tables within hypervisor 116.

Translating the pointer to working set 152 might not be the only virtual address translation used for execution of CA workload of kernel 142. Working set 152 may itself be in the form of a data structure that incorporates pointers, with those pointers being in the virtual address space of the guest process running on VM 120 and executing application 140. The guest virtual address space is likely to differ from host virtual address space of process running CA workload of kernel 142. For example, working set 152 may be a linked list, which, as known in the art, is a list of elements where each element contains a pointer to the next element of the linked list. The pointers in such a linked list would be from the virtual address space of the process that created the linked list, which also may differ from the virtual address space of the process running CA workload of kernel 142 on the host. Creating a custom TLB that translates between virtual addresses of the working set and virtual addresses of the host process that is executing CA workload of kernel 142 on CA 134 allows for sharing of memory on the virtual address level. In this way, a "shared virtual memory" may be implemented between application 140 and CA 134 or software running on CA 134.

At step 208, method 200 determines whether CA workload of kernel 142 uses shared virtual memory during execution of kernel 142. This determination may be made by scanning kernel 142 to see whether working set 152 is referenced by a pointer or by a local variable. The determination may also be made by scanning working set 152 to determine whether working set 152 contains pointers. If it is determined that CA workload of kernel 142 uses shared virtual memory, then method 200 continues to step 210. Otherwise, method 200 skips step 210 and continues to step 212.

Figure 4:
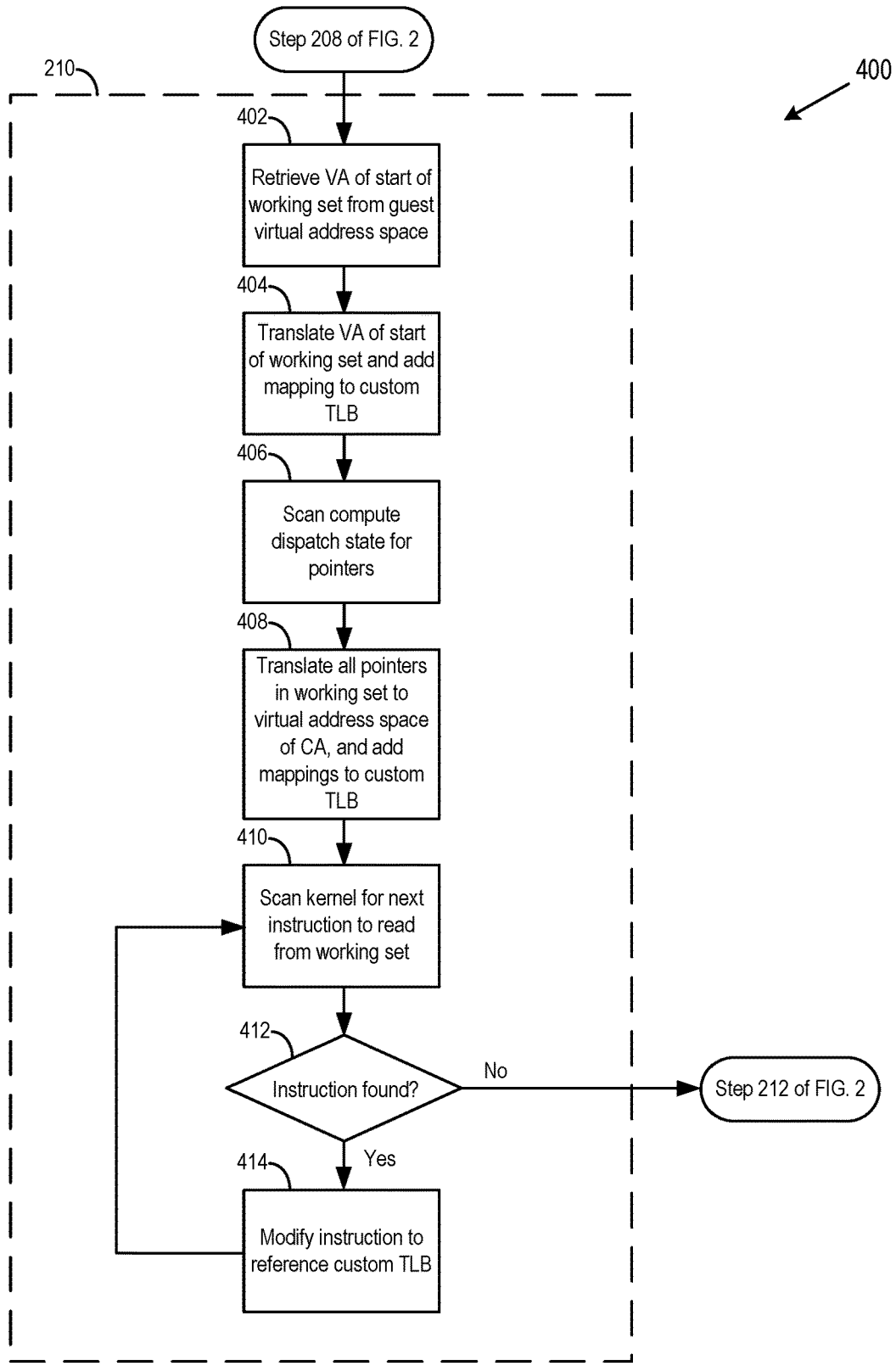
FIG. 4 depicts a flow diagram of a method of implementing shared virtual memory between a workload running on a compute accelerator and an application executing on a virtual machine that is running on a CPU, according to an embodiment.

FIG. 4 depicts a flow diagram of a method 400 of implementing shared virtual memory between a workload running on CA 134 and application 140 executing on VM 120, according to an embodiment. Method 400 of FIG. 4 is an expanded view of step 210 of FIG. 2. In FIG. 4, VM 120 is running on CPU 108. In an embodiment, method 400 is performed by backend 132 before backend 132 translates a command containing a reference to kernel 142 to the API of CA 134. In another embodiment, method 400 is performed by application 140 or by another application that scans executing applications for the presence of kernel 142 and implements shared virtual memory if needed.

At step 402, the virtual address of the start of working set 152 is retrieved from the virtual address space of application 140. Virtual address space of application 140 may be referred to herein as "guest" virtual address space, because VM 120 is a "guest" machine on host 105. That is, if application 140 is not running within VM 120, but is running directly within the operating system of host 105, then the virtual address space of application 140 would be the same as the virtual address space of CA 134, and no virtual shared memory would need to be implemented.

At step 404, the virtual address of the start of working set 152 (from the virtual address space of application 140) is translated to the virtual address space of the host process that is executing CA workload of kernel 142 on CA 134. The translation results in a mapping, for the start of working set 152, between VA of the guest process executing application 140 to VA of host process executing CA workload of kernel 142 on CA 134. The translation or mapping occurs with assistance from hypervisor 116, such as by referencing tables (e.g., page tables, shadow page tables, nested page tables, or extended page tables). The mapping is then stored in custom TLB 138.

To illustrate further, working set 152 is located within system memory 110 at some physical address of system memory 110. The physical address of working set 152 may be translated to an equivalent virtual address that is used by software running within the operating system of host 105. VM 120 emulates a computer and has a similar physical address and virtual address translation scheme, although the physical address of VM 120 is still "virtual" in the sense that it needs to be translated to a physical address of host 105 in order to obtain data from system memory 110. Translation from a guest virtual address to a host virtual or physical address may be accomplished with the help of hypervisor 116, which contains page tables used for the translation, as is known in the art.

At step 406, compute dispatch state 154 is scanned for the presence of references (pointers) to memory backing the working set. The scanning is done so as to create a mapping between virtual addresses of working set 152 and addresses within virtual address space of the host process that is executing CA workload of kernel 142 on CA 134. The mapping is similar to that performed in step 404 for the starting address of working set 152, and is stored within custom TLB 138.

At step 408, each pointer found within working set 152 of compute dispatch state 154 at step 406 is translated to the virtual address space of the host process that is executing CA workload of kernel 142 on CA 134. The mapping resulting from the translation is then added to custom TLB 138. Assuming that all pointers within working set 152 of compute dispatch state 154 are from the virtual address space of the guest process that is executing application 140, then the mapping can be created by consulting page tables within hypervisor 116, as was done at step 404.

By the conclusion of step 408, custom TLB 138 contains all virtual addresses that are referenced during execution of kernel 142, as well as all mappings from those virtual addresses to the virtual addresses of the virtual address space of the host process that is executing CA workload of kernel 142. After step 408, method 400 proceeds to step 410.

At steps 410 through 414, kernel 142 is modified so that instructions that read data from working set 152 reference custom TLB 138 and obtain the proper virtual address for the read instruction. That is, kernel 142 is modified so that, rather than accessing a virtual address from the virtual address space of the guest process executing application 140, kernel 142 instead accesses a virtual address of the host process executing CA workload of kernel 142.

At step 410, kernel 142 is scanned for the next instruction that reads by a pointer from working set 152. At step 412, if no instruction is found, then method 400 continues to step 212 of FIG. 2. If an instruction that reads from working set 152 is found, then method 400 continues to step 414. At step 414, the read instruction of kernel 142 is modified to reference custom TLB 138. The read instruction is modified so that a virtual address from the guest process is used as an index into custom TLB 138, the index maps to a virtual address of the host process, and the virtual address from the host process is then used for the data access to working set 152.

For example, Code Segment 7 below provides a portion of a kernel in which a pointer is used to access working set 152.

---
Code Segment 7
---
```
kernel_transpose(matrix A, matrix B)
{
    thread_id = get_global_id( );
    int row, col;
    for (row = 0; row < A.rows; row++)
    {
        for (col = 0; col < A.cols; col++)
        {
            B[col][row] = A[row][col];
        }
    }
}
```
---

Code Segment 7 above may be modified by step 414 of method 400 to result in Code Segment 8, as follows. Pointers/memory addresses are decomposed into page and intra-page offsets. The TLB translates at the granularity of a page, and assumes all page addresses have a contiguous address space within the page.

---
Code Segment 8
---
```
kernel_transpose(matrix *A, matrix *B, global TLBEntry *tlb)
{
    thread_id = get_global_id( );
    int row, col;
    for (row = 0; row < A.rows; row++)
    {
        for (col = 0; col < A.cols; col++)
        {
            float *svmA, *svmB;
            size_t pageA, pageB;
            size_t pageOffsetA, pageOffsetB;
            //
            // Extract the effective addresses for the individual
            // elements addressed as followed:
            //
            // B[col][row] = A[row][col];
            //
            pageA = (global size_t)(&A[row][col]) >> PAGE_SHIFT;
            pageB = (global size_t)(&B[col][row]) >> PAGE_SHIFT;
            pageOffsetA = (global size_t)(&A[row][col]) & PAGE_MASK;
            pageOffsetB = (global size t)(&B[col][row]) & PAGE_MASK;
            svmA = (global float *)(tlb[pageA].char_ptr + pageOffsetA);
            svmB = (global float *)(tlb[pageB].char_ptr + pageOffsetB);
            *svmB = *svmA;
        }
    }
}
```
---

Returning to FIG. 2, after method 400 completes, step 212 is reached. At step 212, kernel 142 is set up on CA 134. The setup is accomplished by one or more setups call(s) from application 140, through CPU 108, to virtual CA 128. The setup call(s) from application 140 to virtual CA 128 is then retransmitted, in the same or modified form, from virtual CA 128 to each CA 134 that virtual CA 128 has chosen to execute CA workload of kernel 142. Setup call(s) from application 140 to CA 134 proceed through the data flow described in FIG. 1D. Setup call(s) from application 140 include providing kernel 142 to virtual CA 128. The setup calls(s) may also include providing a copy of custom TLB 138 and a copy of offline register file 150 to each CA 134, such as by placing a copy of TLB 138 and a copy of offline register file 150 on CA local memory 136 of each CA 134 executing kernel 142. The setup call(s) may be in the form of a single call that includes a command buffer, as described above.

The setup call(s) may also include a request for resources. If shared virtual memory is not used, the request for resources may be, for example, a request for memory allocation on CA local memory 136 for working set 152, and for memory allocation for the solution of CA workload of kernel 142. For example, if kernel 142 performs a matrix transpose CA workload, then a request for memory on CA local memory 136 may include a request for memory to store original matrix A, and a request for memory to store solution matrix B. If shared virtual memory is used, then a request to store original matrix A may not be required. As part of step 212, kernel 142 is set up on each CA 134 chosen by virtual CA 128 to perform CA workload of kernel 142. This may be done, for example, by placing a copy of kernel 142 on CA local memory 136 of each CA 134 that will be executing kernel 142.

At step 214, working set 152 is provided to each CA 134 that will be executing kernel 142. If shared virtual memory is not used, application 140, working through CPU 108, sends working set 152 to virtual CA 128, which then sends working set 152 to each CA 134 that will be executing kernel 142. Sending of working set 152 from application 140 to CA(s) 134 proceeds through the data flow described in FIG. 1D, above. If virtual shared memory is used, then step 214 may be skipped, because then working set 152 may be provided to CA 134 by a pointer within kernel 142.

At step 216, CA(s) 134 executes kernel 142. Optionally, CPU 108 may also execute kernel 142. If kernel 142 has not been augmented by step 206, then kernel 142 executes and method 200 continues to step 218 without executing method 500 of FIG. 5. If kernel 142 has been augmented with halting points at step 206, then method 200 continues to step 502 of method 500 in FIG. 5.

Figure 5:
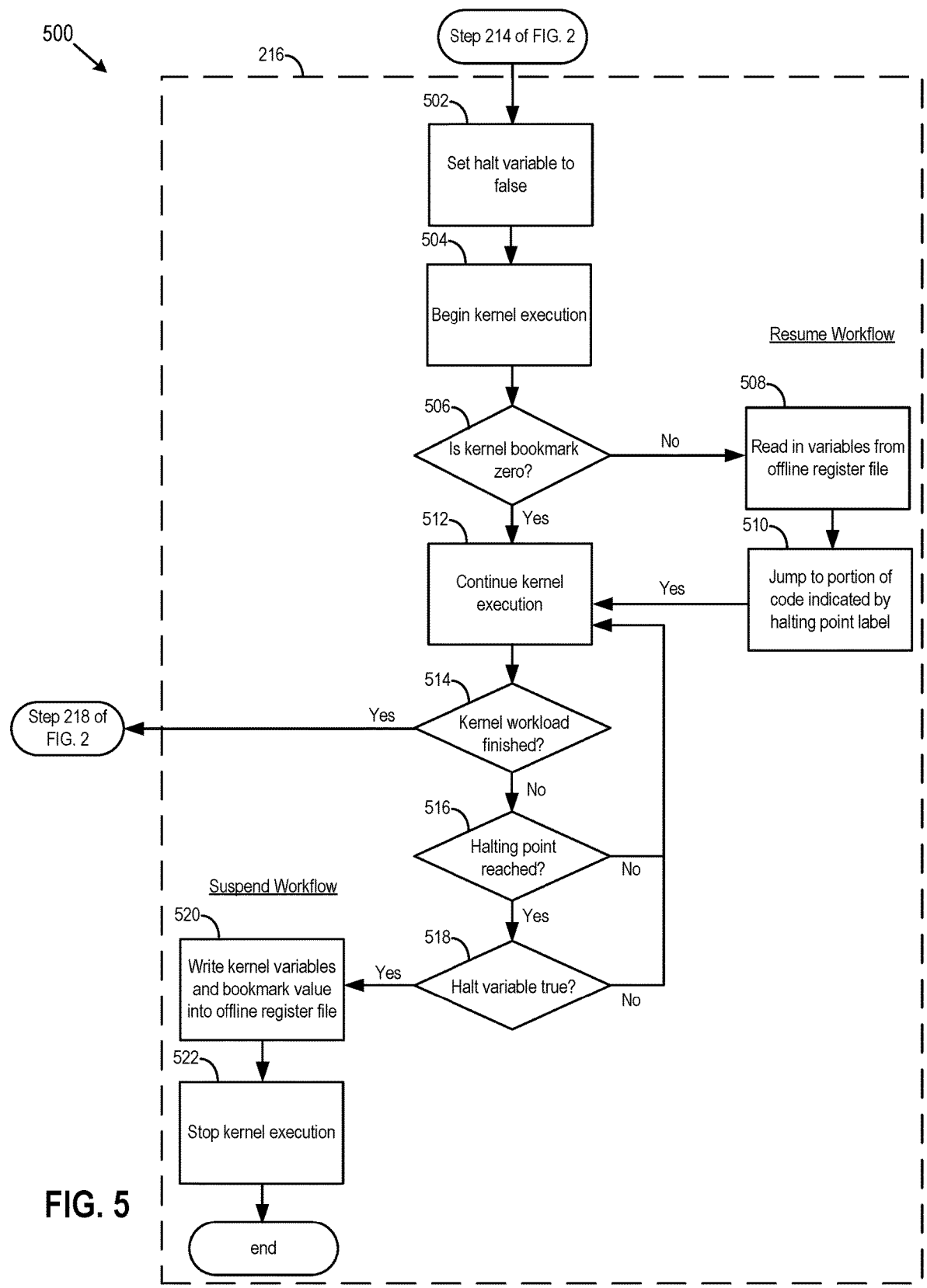
FIG. 5 depicts a flow diagram of a method of executing a kernel that has been augment with halting points, according to an embodiment.

FIG. 5 is an expanded view of step 216 for executing an augmented kernel. FIG. 5 depicts a flow diagram of a method of executing kernel 142 that has been augmented with halting points by step 206, according to an embodiment. Method 500 encompasses the execution of augmented kernel 142 from start to finish, including suspending the execution before the CA workload is finished and including resuming the execution from a previous suspend. Method 500 is executed by CA 134, and optionally also by CPU 108.

At step 502, the halt variable within offline register file 150 is set to zero. At step 502, the halt variable may be set to zero by default upon initial launch or upon a resume, and so no active step to set halt variable within offline register file 150 to zero may be required.

During method 500, offline register file 150 may be referred to in the singular to collectively refer multiple copies of offline register file 150 present among one or more CA local memories 136 of CAs 134 executing kernel 142. In an embodiment in which several copies of offline register file 150 present among the one or more CA(s) 134 executing kernel 142, a synchronization mechanism exists that synchronizes values within the various files, as needed for proper execution, at required time points. In another embodiment, only a single copy of offline register file 150 exists during execution of kernel 142, such as within system memory 110, and the single copy of offline register file 150 is accessible to all CA(s) 134 executing kernel 142.

At step 504, execution of kernel 142 begins on one or more CA 134, and optionally, on CPU 108. At step 506, the value of the bookmark variable in offline register file 150 is checked. If the value of the bookmark variable is non-zero, this indicates that the kernel is resuming from a previous suspend and method 500 proceeds to step 508. Step 504 corresponds to execution of the if-statements within read predicates that were inserted into kernel 142 in step 318 of FIG. 3. These read predicates are shown in bolded font within Code Segment 6, above. If bookmark value is zero, then this execution of kernel 142 is an initial launch, not continuing from a previous suspend, and method 500 proceeds to step 512.

Steps 508 and 510 constitute a "resume workflow" of method 500. Steps 508 and 510 occur if this execution of kernel 142 is a resume after a previous suspend. Steps 508 and 510 are illustrated in code within the body of read predicates shown in bold font in Code Segment 6, above. At step 508, CA 134 reads in variables of kernel 142 from offline register file 150.

At step 510, the execution on of kernel 142 on CA 134 jumps to the portion of code where the previous suspend operation halted the CA workload of kernel 142. That portion of code of kernel 142 is indicated by the bookmark value, which indicates the halting point label of the jump instruction. The jump instruction takes the execution to the portion of the code where the previous suspend operation halted the CA workload of kernel 142. For example, within Code Segment 6, the halting point label follows the "goto" command within a read predicate. After step 510, method 500 continues to step 512, at which execution of kernel 142 continues, starting from the halting point label, such as for the example the label indicated after the "goto" command of the read predicate of Code Segment 6.

At step 512, execution of kernel 142 continues. At step 514, if execution of kernel 142 has completed, then method 500 proceeds to step 218 of FIG. 2. If execution of kernel 142 has not completed, then method 500 proceeds to step 516.

At step 516, if a halting point has not been reached and the kernel workload is not finished, then method 500 returns to step 512, where execution of kernel 142 continues. If at step 516 a halting point has been reached, then the value of the halt variable within offline register file 150 is checked at step 518. Step 518 corresponds to execution of the conditional within the if-statement of the halting predicate shown in bold font in Code Segment 2, above. If the halt variable is false, as would be the usual case, then method 500 proceeds to step 512 and execution of kernel 142 continues uninterrupted. If the halt variable is true, this indicates that CA workload of kernel 142 is to be suspended, and method 500 proceeds to step 520.

Steps 520 and 522 constitute a "suspend workflow" of method 500. Steps 520 and 522 occur if someone, like an administrator or user, sends a suspend command to CA 134, such as to schedule a higher priority CA workload. Alternatively, the suspend command may be sent automatically if something like a software module determines that this execution of kernel 142 should be suspended, such as for load balancing reasons.

At step 520, CA 134 writes the value of kernel variables and the value of the bookmark variable to offline register file 150. Step 520 corresponds to execution of the body of the if-statement of the halting predicate shown in bold font in Code Segment 2, above. At step 522, execution of kernel 142 stops and method 500 ends. Step 522 corresponds to the return statement within a halting predicate, such as the halting predicate shown in Code Segment 2. After step 522, method 500 ends and does not return to the method of FIG. 2.

After the suspend workflow of method 500, a variety of operations may be performed on the suspended CA workflow. One such operation is the migration of VM 120, on which application 140 is/was executing, to a new host 105. Migrating VM 120 on which application 140 is executing would also migrate CA workload of kernel 142. Migrating VM 120 would also migrate application 140, kernel 142, offline register file 150, working set 152, any results/solutions generated by the executing kernel 142 before suspending, and optionally custom TLB 138. The new host 105 may be located on data center 102 or remote data center 104, across network 146 from data center 102. The suspended VM 120 may be migrated to a new host 105 by methods known in the art to migrate a VM, such as the method described in U.S. patent application Ser. No. 13/760,868, filed Feb. 6, 2013, or the method described in U.S. patent application Ser. No. 14/798,483, filed Jul. 14, 2015. The entire contents of both of these applications are incorporated by reference herein.

After a migration, CA workload of kernel 142 may be resumed on a new host 105. Prior to resuming, steps 210, 212, and 214 of FIG. 2 may need to be performed again, so as to refresh custom TLB 138 with new virtual addresses reflecting the new virtual address space of the new host 105, so as to set up kernel 142 on the new CA 134, and so as to provide working set 152 to new CA 134. After steps 210, 212, and 214, the resume workflow (including steps 508 and 510) of method 500 would be performed to execute kernel 142 on the new host 105.

After completion of method 500 through step 514, either through uninterrupted execution or after the resume workflow, method 500 proceeds to step 218 of FIG. 2. Step 218 of FIG. 2 is an optional step. After step 216, the results of kernel execution are ready for retrieval. At step 218, the results are optionally retrieved from CA local memory 136 by application 140. The results may remain on CA local memory 136 if, for example, application 140 is to perform a subsequent CA workload that uses the results as a new working set 150 for the subsequent CA workload.

The results of CA workload of kernel 142 may be distributed among several CA local memories 136. For example, if the CA workload was a matrix transpose, then virtual CA 128 may have divided up the transposition work among several CAs 134. Prior to application 140 retrieving results of CA workload at step 218, the results from several CA local memories 136 may need to be combined into one complete results set, such as into one complete transposed matrix. In an embodiment, the combining may be performed by virtual CA 128. After step 218, method 200 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of implementing shared virtual memory between an application and one or more compute accelerators, the method comprising:
   (a) launching the application on a central processing unit (CPU) of a host computer, the application including a compute kernel that includes one or more functions;
   (b) creating a custom translation lookaside buffer (TLB) by:
      obtaining a reference that points to a data item within a portion of memory of the host computer, the portion of memory containing a working set that is an input for the one or more functions;
      translating the reference from a virtual address space of the application to a virtual address space of the one or more compute accelerators, wherein the virtual address space of the one or more compute accelerators is associated with at least one local memory of one of the one or more compute accelerators; and
      adding a mapping, to the custom TLB, of (a) a virtual address of the data item within the virtual address space of the application to (b) a virtual address of the data item within the virtual address space of the one or more compute accelerators; and (c) executing, on the one or more compute accelerators, the compute kernel, wherein the compute kernel accesses the custom TLB during the execution of the compute kernel.

2. The method of claim 1, wherein the application is executing within a virtual machine (VM) running within the host.

3. The method of claim 1, wherein the reference is a pointer to the start of the working set.

4. The method of claim 1, wherein the translating occurs at least in part by a hypervisor running on the host computer, and wherein the hypervisor references page tables for the translating.

5. The method of claim 1, further comprising setting up, by the CPU, the compute kernel on the one or more compute accelerators.

6. The method of claim 1, further comprising modifying the compute kernel to reference the custom TLB when reading from the working set.

7. The method of claim 1, wherein the compute kernel includes one or more conditional halting points.

8. The method of claim 7, further comprising:
suspending execution of the compute kernel at one of the one or more conditional halting points, the suspending comprising:
setting a bookmark value associated with the compute kernel to indicate the one of the one or more conditional halting points; and
writing values of kernel variables associated with the execution of the compute kernel to a file; and
resuming the execution of the compute kernel at the one of the one or more conditional halting points, the resuming comprising:
reading the values of the kernel variables from the file; and
determining the one of the one or more conditional halting points based on the bookmark value.

9. A non-transitory computer readable medium comprising instructions to be executed in a processor of a computer system, the instructions when executed in the processor cause the computer system to carry out a method of implementing shared virtual memory between an application and one or more compute accelerators, the method comprising:
(a) launching the application on a central processing unit (CPU) of a host computer, the application including a compute kernel that includes one or more functions;
(b) creating a custom translation lookaside buffer (TLB) by:
obtaining a reference that points to a data item within a portion of memory of the host computer, the portion of memory containing a working set that is an input for the one or more functions;
translating the reference from a virtual address space of the application to a virtual address space of the one or more compute accelerators, wherein the virtual address space of the one or more compute accelerators is associated with at least one local memory of one of the one or more compute accelerators; and
adding a mapping, to the custom TLB, of (a) a virtual address of the data item within the virtual address space of the application to (b) a virtual address of the data item within the virtual address space of the one or more compute accelerators; and (c) executing, on the one or more compute accelerators, the compute kernel, wherein the compute kernel accesses the custom TLB during the execution of the compute kernel.

10. The non-transitory computer readable medium of claim 9, wherein the application is executing within a virtual machine (VM) running within the host.

11. The non-transitory computer readable medium of claim 9, wherein the reference is a pointer to the start of the working set.

12. The non-transitory computer readable medium of claim 9, wherein the translating occurs at least in part by a hypervisor running on the host computer, and wherein the hypervisor references page tables for the translating.

13. The non-transitory computer readable medium of claim 9, the method further comprising setting up, by the CPU, the compute kernel on the one or more compute accelerators.

14. The non-transitory computer readable medium of claim 9, further comprising modifying the compute kernel to reference the custom TLB when reading from the working set.

15. The non-transitory computer readable medium of claim 9, wherein the compute kernel includes one or more conditional halting points.

16. The non-transitory computer readable medium of claim 15, the method further comprising:
suspending execution of the compute kernel at one of the one or more conditional halting points, the suspending comprising:
setting a bookmark value associated with the compute kernel to indicate the one of the one or more conditional halting points; and
writing values of kernel variables associated with the execution of the compute kernel to a file; and
resuming the execution of the compute kernel at the one of the one or more conditional halting points, the resuming comprising:
reading the values of the kernel variables from the file; and
determining the one of the one or more conditional halting points based on the bookmark value.

17. A computer system comprising:
a host computer comprising a central processing unit (CPU);
one or more compute accelerators; and
a processor, wherein the processor is programmed to carry out a method of implementing shared virtual memory between an application and the one or more compute accelerators, the method comprising:
(a) launching the application on the CPU of the host computer, the application including a compute kernel that includes one or more functions;
(b) creating a custom translation lookaside buffer (TLB) by:
obtaining a reference that points to a data item within a portion of memory of the host computer, the portion of memory containing a working set that is an input for the one or more functions;
translating the reference from a virtual address space of the application to a virtual address space of the one or more compute accelerators, wherein the virtual address space of the one or more compute accelerators is associated with at least one local memory of one of the one or more compute accelerators; and adding a mapping, to the custom TLB, of (a) a virtual address of the data item within the virtual address space of the application to (b) a virtual address of the data item within the virtual address space of the one or more compute accelerators; and (c) executing, on the one or more compute accelerators, the compute kernel, wherein the compute kernel accesses the custom TLB during the execution of the compute kernel.

18. The computer system of claim 17, wherein the application is executing within a virtual machine (VM) running within the host.

19. The computer system of claim 17, wherein the reference is a pointer to the start of the working set.

20. The computer system of claim 17, wherein the translating occurs at least in part by a hypervisor running on the host computer, and wherein the hypervisor references page tables for the translating.

\* \* \* \* \*